United States Patent
Kucera et al.

(10) Patent No.: US 10,841,205 B2
(45) Date of Patent: Nov. 17, 2020

(54) MULTI-PATH WIRELESS COMMUNICATION

(71) Applicant: Alcatel Lucent, Nozay (FR)

(72) Inventors: Stepan Kucera, Dublin (IE); Milind Buddhikot, Murray Hill, NJ (US)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/097,996

(22) PCT Filed: May 5, 2017

(86) PCT No.: PCT/EP2017/060774
§ 371 (c)(1),
(2) Date: Oct. 31, 2018

(87) PCT Pub. No.: WO2017/194406
PCT Pub. Date: Nov. 16, 2017

(65) Prior Publication Data
US 2019/0149455 A1   May 16, 2019

(30) Foreign Application Priority Data

May 9, 2016 (EP) ..................... 16305533

(51) Int. Cl.
*H04L 12/707* (2013.01)
*H04L 29/08* (2006.01)
(Continued)

(52) U.S. Cl.
CPC ............ *H04L 45/24* (2013.01); *H04L 67/141* (2013.01); *H04L 69/163* (2013.01); *H04W 40/02* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 2011/0153722 A1 | 6/2011 | Choudhary et al. | |
| 2012/0307818 A1* | 12/2012 | Guey | ................. H04L 27/2607 370/342 |

(Continued)

FOREIGN PATENT DOCUMENTS

| | | |
|---|---|---|
| CN | 102201991 A | 9/2011 |
| CN | 102387544 A | 3/2012 |

(Continued)

OTHER PUBLICATIONS

A. Ford et al., "Architectural Guidelines for Multipath TCP Development," Internet Engineering Task Force (IETF), pp. 1-29, XP015075927, Mar. 2011.

International Search Report for PCT/EP2017/060774 dated Jun. 26, 2017.

Jonathan Ling et al., Enhanced Capacity & Coverage by Wi-Fi LTE Integration, IEEE Communications Magazine, vol. 53 Issue 3, printed from https://ieeexplore.ieee.org/documents on Jan. 8, 2019, 6 pages.

(Continued)

*Primary Examiner* — Christine T Duong
(74) *Attorney, Agent, or Firm* — Fay Sharpe LLP (57) ABSTRACT

A client and a server communicate over multiple wireless access paths each using a different wireless network. A method performed at the server comprises receiving at the server a signal from the client via one of multiple wireless access paths, the signal comprising a transport layer portion including a transport layer identifier, the transport layer identifier providing an indication of a wireless access path, a network layer portion, and a data portion, determining from the transport layer identifier, a destination of at least a subset of the signals from the wireless access path indicated by the transport layer identifier, and routing the signal to the destination. If a flow is diverted to travel via a different route, then there must be some mechanism to ensure that the signal arrives at its intended destination. Preferably, a Multi-path Transport Control Protocol (MPTCP) is used as the transport layer protocol.

20 Claims, 6 Drawing Sheets

(51) Int. Cl.
  *H04W 40/02* (2009.01)
  *H04W 80/06* (2009.01)
  *H04L 29/06* (2006.01)

(56) References Cited

U.S. PATENT DOCUMENTS

| | | |
|---|---|---|
| 2013/0077501 A1 | 3/2013 | Krishnaswamy et al. |
| 2013/0194963 A1* | 8/2013 | Hampel .................. H04L 45/24 370/254 |
| 2013/0318239 A1 | 11/2013 | Scharf et al. |
| 2015/0350337 A1 | 12/2015 | Biswas |
| 2016/0360557 A1* | 12/2016 | Lavi ...................... H04W 76/10 |
| 2017/0118787 A1* | 4/2017 | Kekki .................. H04W 76/16 |
| 2017/0222917 A1* | 8/2017 | Reddy ..................... H04L 45/24 |

FOREIGN PATENT DOCUMENTS

| | | |
|---|---|---|
| CN | 102771090 A | 11/2012 |
| CN | 103597794 A | 2/2014 |
| CN | 105282211 A | 1/2016 |
| WO | 2015153765 A1 | 10/2015 |
| WO | WO 2015/185081 A1 | 12/2015 |

OTHER PUBLICATIONS

European Patent Application No. 16305533.8-1862, Extended European Search Report, dated Oct. 27, 2016, 8 pages.

PCT Patent Application No. PCT/EP2017/060774, Written Opinion of the International Searching Authority, dated Jun. 26, 2017, 8 pages.

English Bibliography of Chinese Application Publication No. CN102201991A, Published on Sep. 28, 2011, Printed from Derwent Innovation on Aug. 7, 2020, 6 pages.

English Bibliography of Chinese Application Publication No. CN102387544A, Published on Mar. 21, 2012, Printed from Derwent Innovation on Aug. 7, 2020, 5 pages.

English Bibliography of Chinese Application Publication No. CN102771090A, Published on Nov. 7, 2012, Printed from Derwent Innovation on Aug. 7, 2020, 7 pages.

English Bibliography of Chinese Application Publication No. CN103597794A, Published on Feb. 19, 2014, Printed from Derwent Innovation on Aug. 7, 2020, 7 pages.

English Bibliography of Chinese Application PublicationNo. CN105282211A, Published on Jan. 27, 2016, Printed from Derwent Innovation on Aug. 7, 2020, 6 pages.

* cited by examiner

Value space of TCP SEQ (downlink)

Value space of TCP SEQ (uplink)

Value space of TCP TSval

FIG. 4

IP ... IP header information
TID ... TCP header identifiers (TCP SEQ #, ACK #, time stamps)
R ... other TCP header information (checksum, flags, etc.)

MULTI-PATH WIRELESS COMMUNICATION

FIELD OF THE INVENTION

The field of the invention relates to wireless communication networks and in particular, to networks with multiple wireless paths between clients and servers.

BACKGROUND

Modern mobile devices such as smart phones and tablets have ever increasing data requirements. They also typically support multi-technology multi-band networking and are commonly equipped with multiple LTE, HSPA, WiFi transceivers operational in multiple licensed and unlicensed frequency bands. Additionally allocation of new (shared) frequency bands can be expected in the near future.

The capability of communicating over multiple radio interfaces can be exploited by enabling multi-path data delivery over parallel wireless links (paths). This use of multiple resources to deliver data could provide a significant increase of throughput and link reliability as well as reduced latency compared to the conventional single-path paradigm.

However, communicating over different paths may not be straightforward and the experienced quality of integrated multi-path wireless service may be uneven.

In order to determine how to use multiple access networks to deliver data efficiently, the different properties of the different access networks need to be considered. IEEE WiFi networks, for example, are typically characterized by high peak rates, but lower efficiency for small packets, and by limited coverage due to low transmit power limits. More critically, however, their effective throughput degrades as a function of the overall load due to frequent packet collisions as communication under WiFi are performed on a contention-based medium access scheme, which means that collisions will occur. For example, TCP acknowledgments (ACK) on the uplink can cause around 30% degradation of the TCP payload flow on the downlink owing to uplink-downlink collisions.

On the other hand, 3GPP HSPA/LTE networks are characterized by ubiquitous coverage, high spectral efficiency, and scheduled (collision-free) medium access, although they use comparatively smaller bandwidths than WiFi, and typically experience longer end-to-end packet delivery latency.

It would be desirable to find a practical solution for high-quality multi-path communications.

SUMMARY

A first aspect of the present invention provides a method performed at a server, of routing a signal received from a client, said client and server being connected via multiple wireless access paths, each using a different access network, the method comprising: receiving at said server a signal from said client via one of said wireless access paths, said signal comprising a transport layer portion including a transport layer identifier, said transport layer identifier providing an indication of a wireless access path, a network layer portion, and a data portion; and determining a destination of at least a subset of said signals from said wireless access path indicated by said transport layer identifier; and routing said signal to said destination.

The inventors of the present invention recognised that it may be desirable where multiple paths are available between devices to divert some flow to different paths. Diverting flows may be addressed in different ways, for example by modifying the network layer to apply different IP routing to certain flows. This, however, has some disadvantages as the modification takes place in the network routing layer which requires amendment of this layer. Furthermore, it may only be deployable in locally integrated LTE and WiFi situations.

The network layer portion of the signal may comprise a number of parameters and in some embodiments these comprise an indication of the source and the destination, which may be in the form of an IP address. Where multiple paths using different radio interfaces or wireless access networks link the source and destination, the network layer portion does not just provide an indication of the source and destination device but also of a location on the device that the traffic is sent from or received at. This is important as signals sent along a particular path are analysed on receipt to check that they have been correctly received and then they are reassembled. Thus, the signals on a particular path are routed to a destination which may comprises a particular socket having a receiver and processor for receiving signals sent on that path.

If a flow is diverted to travel via a different route, then there must be some mechanism to ensure that the signal arrives at its intended destination. The inventors recognised that although the network layer is used to provide control information for routing the signal, signals also carry transport data. The transport data is used to enable data to be separated into packets for transmission and for the packets to be reassembled at the destination. Thus, this transport information carries some identification data relating to the connection or network path. This identification data can be used to provide an indication of the route that the data was scheduled to take (prior to any amendment) and thus, where the route has been amended perhaps by amending the network layer, the destination could still be determined by looking at the wireless access path that is indicated by the transport layer. Thus, determining the destination from the transport layer is one way of ensuring that a packet that has been re-routed via a different wireless access path arrives at the correct destination. A wireless access path is the path taken between the source and the destination.

In some embodiments, said method comprises analysing at least a subset of said signals and where said transport layer identifier indicates a different wireless access path to said network layer portion, amending said network layer parameters to correspond to said wireless access path indicated by said transport layer identifier.

As noted previously the destination of the signals can be determined from the transport layer. It may be advantageous to compare the destination indicated by the transport layer with that indicated by the network layer and where there is a discrepancy to change the network layer to correspond to the destination indicated by the transport layer. In this way signals where the routing has been changed are detected and their routing to the correct destination is ensured by simply changing the network layer parameters to correspond to the destination indicated in the transport layer thereby allowing the usual routing functionality of the system which routes signals using the network layer parameters to route the signal.

In some embodiments, said data portion comprises response data generated by said client in response to receipt of a data signal transmitted by said server, said transport layer identifier associated with said response signal identifying said wireless access path that said corresponding data signal was transmitted on.

The signals that it may be advantageous to transmit via a different access path than is originally envisaged when the signal is generated, may be response signals transmitted by the client in response to receipt of a data signal. This is particularly appropriate where data is being sent via a contentious based transmission scheme such as is used by WiFi. Diverting response signals via an access network that uses a scheduled communication scheme such as a cellular link, reduces collisions and improves performance.

In some embodiments, the method comprises an initial step of analysing signals transmitted when establishing a session connection between said client and said server and determining a wireless access path used for said session connection and a transport layer identifier associated with said session connection.

When communicating with each other the client and server do so over a wireless access path that is provided by one of the wireless access networks. They may establish a session connection for a particular communication using a particular wireless access network. This session connection is a temporary access connection provided by the wireless access network between the two devices and is provided to use the wireless access path provided by that wireless access network. The transport layer identifier may be an identifier associated with a session connection that is set up when the session connection between the server and client is established. This session connection will have been formed using a particular access network and thus, the transport layer identifier associated with a signal transmission can provide an indication of the wireless access path corresponding to that network. It may be advantageous if this information is stored within the server and used by the analyser for analysing which network access path is associated with which transport layer identifier. In some cases, the transport layer identifier associated with a particular connection may not be a static number but may evolve with time and in such a case, it may be advantageous to monitor the evolution of the transport layer identifier associated with the connection and keep a record of this such that the analysing step can accurately identify the session connection and thus, the wireless access network associated with a transport layer identifier.

In some embodiments, the method comprises receiving a network policy indicating particular types of signals that may be re-routed via other wireless access paths, said subset of signals being said signals of said indicated type.

As noted previously, it may be advantageous to re-route certain signals via different access connections or paths and this may be determined by a network policy which indicates the particular types of signals that may require re-routing. Where this is the case, it may be advantageous if that network policy is provided to the server and the server may then restrict its determination of destination from the transport layer to the types of signals indicated in the network policy. For example, it may be response signals on the uplink signal that are re-routed and thus, the analyser can determine whether a signal is a response signal or not and where not, can simply route them in the normal way and where they are determined to be a response signal an analysis of the destination indicated by the transport layer identifier can be performed.

In some embodiments, said determining step comprises determining whether said transport layer portion of said signal has an expected size and where a size of said portions is larger than said expected size, discarding a first part of said transport layer portion and analysing a remaining part.

In some cases, in order to provide intermediate security devices or so-called middle boxes, such as firewalls with the impression that response signals are response signals that are to be expected on that network connection, the response signals are appended to "native" response signals for that access network. In this regard, a middle box may be looking for a response signal of a particular form, and thus, this will appear to be sent. In order for this to function then the analysing step will need to determine which portion to analyse. Thus, it determines whether the portion of the signal comprising the transport layer data is of the expected size and where it is not, it will discard the initial portion which is there to deceive the intermediate boxes and will analyse the latter portion.

In some embodiments, said determining step is performed at a processor arranged before or after said network layer.

One advantage of embodiments of the present invention is that the processing required for re-routing the received signal at the server to take account of the different path it has come along, is not performed at the network layer such that this does not need to be amended which allows this process to be applied to existing systems simply by adding an additional processing portion. This additional separate processor may be located either before or after the network layer which makes the processing simpler and enables it to be used with legacy equipment. This takes advantage of the way that the processing occurs which allows any signal diversion to be detected by comparing information regarding routing that is present in both the transport layer and network layer portions and where there is a discrepancy selecting the final destination from the transport layer information.

Embodiments provide a method that is performed at a server, of routing a signal received from a client, said client and server being connected via multiple wireless access paths, each using a different access network, the method comprising: receiving at said server a signal from said client via one of said wireless access paths, said signal comprising a transport layer portion including a transport layer identifier, said transport layer identifier providing an indication of a wireless access path, a network layer portion, and a data portion; analysing said transport layer identifier and said network layer portion and where said transport layer identifier indicates a different wireless access path to said network layer portion, routing said signal in dependence upon said wireless access path indicated by said transport layer identifier.

If a flow is diverted to travel via a different route, then there must be some mechanism to ensure that the signal arrives at its intended destination. The inventors recognised that although the network layer is used to provide control information for routing the signal, signals also carry transport data. The transport data is used to enable data to be separated into packets for transmission and for the packets to be reassembled at the destination. Thus, this transport information carries some identification data relating to the connection. This identification data can be used to provide an indication of the route that the data was scheduled to take (prior to any amendment) and thus, where the network layer has been amended to re-route the packet or signal, this could be determined by comparing the route indicated by the network layer with that indicated by the transport layer and where there is a difference, this an indication that re-routing has occurred and the original destination can be retrieved from the transport layer identifier.

In some embodiments, said analysing step is performed prior to a network layer routing step and comprises amending said network layer parameters to correspond to said wireless access path indicated by said transport layer identifier.

Although the analysing step can be performed after the network layer routing step, in some embodiments it is performed before that step and in this case the determination at the analysing step that the transport layer identifier identifies a different wireless access path than the network layer routing step, enables the signal to be re-routed by simply changing the network layer parameters and the network layer routing step can route it to the appropriate destination. In this regard, the server may have several transport control protocol sockets each having a particular network address and each adapted to receive signals directed to them via a particular network. The transport layer identifier can be used to identify such a socket and the network layer can map to that socket with an appropriate parameter. The network layer parameters that are changed act as network route identifiers and in some cases are IP addresses and it is the IP address that is changed.

A second aspect of the present invention provides a method performed at a client of routing a signal to a server via one of multiple wireless access paths, each using a different access network, the method comprising: generating a signal comprising a transport layer portion including a transport layer identifier, a network layer portion, and a data portion; said transport layer identifier and said network layer portion providing an indication of a wireless access path; determining whether said signal is to be transmitted via a wireless access path that is different to that indicated by said network layer portion and said transport layer identifier; and when so, amending said network layer portion to indicate said new wireless access path and maintaining said transport layer identifier such that said original wireless access path is derivable therefrom.

The inventors of the present invention recognise that in some instances it may be advantageous to re-route a signal from a client to a server where multiple paths are available such that it travels across a different path than first envisaged. Although this may have advantages for increased throughput and link reliability, it can cause problems when the signal arrives at the destination device as it needs to be directed to the correct place. In this regard, the destination device will have different receivers for the different network access connections and will expect certain signals to arrive at certain receivers. The inventors of the present invention recognise that when a session connection is set up between a source and destination device then there is a transport layer protocol which is used to identify signals transmitted on this connection, such that where for example a file of data is broken into different data packets, these can be reassembled when it is received, from information transmitted with the data in the transport layer using the transport layer protocol. Thus, in addition to the signal comprising a network layer portion which includes routing information perhaps in the form of IP addresses, there is also a transport layer protocol portion which will identify a particular connection that has been formed between the client and server to transmit certain data. Thus, this identifier can be used as an indication of the network access path that is used for the transmission signals associated with this connection. Thus, where the network layer is amended to route the signal via a different route to that originally envisaged, the original route and thus, the desired destination, can be retrieved from the signal from the transport layer portion. In this way, signals can be re-routed to different network access paths and their routing to the final destination can be assured in a way that does not impact on the network layer itself and can therefore be implemented separately from this in an efficient and relatively straightforward manner.

In some embodiments, the method comprises on establishing a session connection between said client and said server for transmitting a set of signals, providing said session connection with a transport layer identifier that provides a unique identifier for said session connection, said transport layer identifier being associated with each of said signals within said set of signals.

As noted previously, a transport layer identifier will identify a particular session connection that is formed between a client and server. It is advantageous if it is unique to that particular session connection such that the connection can be determined from this identifier and the network access path established for that session can be derived.

In some embodiments, said step of providing a unique transport layer identifier comprises generating a transport layer identifier and providing said transport layer identifier with an offset.

One way of providing the transport layer identifier is to use a sequence number which may increase as messages are transmitted. Providing a sequence number that has an offset to previously generated ones is one way of providing a unique indicator.

In some embodiments, the method further comprises receiving a network policy indicative of signals to be re-routed over access paths that are different to those indicated by a network layer associated with said signals, said step of determining being performed in dependence said received network policy.

As noted previously, it is advantageous to re-route some signals over different access paths to reduce the number of collisions. For example, uplink signals transmitted via Wi-Fi may collide with the downlink signals and it may be advantageous to transmit them instead over a link with a scheduled transmission policy. In order to determine which signals to re-route, a network policy may be provided to the client and in response to this it will determine what type of signal is currently being transported and whether to amend the network layer portion to send it via a different route or not.

In some embodiments, the method further comprises in addition to amending said network layer portion, amending said transport layer portion by appending said generated transport layer portion to a spoof transport layer portion suitable for a signal transmitted over said new wireless access path.

In some cases in order to avoid the intermediate boxes in the network such as firewalls recognising the signals as not being native to that wireless access path and intercepting them, the signals that are transmitted on that connection may be spoofed by appending a transport layer portion suitable for perhaps an analogous signal that is transmitted on that connection. Thus, header data used for a previous signal may be mimicked and appended to a front end of the signal being transmitted.

Although the transport layer identifier can comprise a number of things, in some embodiments it comprises a TCP (transport control protocol) sequence/acknowledgement number and a TCP time stamp value. TCP is a well-known protocol used for transmitting data over wireless networks which allows data packets to be transmitted individually and to be combined at the server in the correct order owing to the sequence number and the time stamp value. Furthermore, having these two values associated with the message or signal allows the connection that the message or signal is transmitted on to be uniquely identified and thus, the wireless access path that is associated with that connection to be identified.

A third aspect of the present invention provides a computer program which when executed by a processor is operable to control said processor to perform a method according to a first aspect of the present invention.

A fourth aspect of the present invention provides a computer program which when executed by a processor is operable to control said processor to perform a method according to a second aspect of the present invention.

A fifth aspect of the present invention provides a routing device for routing a signal received at a server from a client via one of multiple wireless access paths, each using a different access network; said signal comprising a transport layer portion including a transport layer identifier, said transport layer identifier providing an indication of a wireless access path, a network layer portion, and a data portion; said routing device comprising an analyser configured to determine a destination of at least a subset of said signals from said wireless access path indicated by said transport layer identifier and routing circuitry configured to route said signal to said destination.

In some embodiments, said analyser is configured to amend said network layer parameters to correspond to said wireless access path indicated by said transport layer identifier.

In some embodiments, said data portion comprises response data generated by said client in response to receipt of a data signal transmitted by said server, said transport layer identifier associated with said response signal identifying said wireless access path that said corresponding data signal was transmitted on.

In some embodiments, said analyser is configured to analyse signals transmitted when establishing a session connection between said client and said server and to determine therefrom a wireless access path used for said session connection and a transport layer identifier associated with said wireless access path.

In some embodiments, said analyser is configured to monitor evolution of said transport layer identifier associated with said session connection.

In some embodiments, said analyser is configured to receive a network policy indicating particular types of signals that may be re-routed via other network access paths said subset of signals being signals of said indicated type.

In some embodiments, said analyser is further configured to determine whether said transport layer portion of said signal has an expected size and where a size of said portions is larger than said expected size, to discard a first part of said transport layer portion corresponding to said expected size and to analyse a remaining part.

One embodiment provides a routing device for routing a signal received at a server from a client via one of multiple wireless access paths, each using a different access network; said signal comprising a transport layer portion including a transport layer identifier, said transport layer identifier providing an indication of a wireless access path, a network layer portion, and a data portion; said routing device comprising an analyser configured to compare said transport layer identifier and said network layer portion and where said transport layer identifier indicates a different wireless access path to said network layer portion, to route said signal in dependence upon said wireless access path indicated by said transport layer identifier.

A sixth aspect of the present invention provides a server for providing content to a plurality of clients via a plurality of wireless access paths each using a different access network, said server comprising a routing device according to a fifth aspect of the present invention.

A seventh aspect of the present invention provides a processor for processing a signal to be routed from a client to a server via one of multiple wireless access paths, each using a different access network, said signal comprising a transport layer portion including a transport layer identifier, a network layer portion, and a data portion, said transport layer identifier and said network layer portion providing an indication of a wireless access path; said processor comprising determining circuitry for determining whether said signal is to be transmitted via a wireless access path that is different to that indicated by said network layer portion and said transport layer identifier; and when so said processor being configured to amend said network layer portion to indicate said different wireless access path and to maintain said transport layer identifier such that said original wireless access path is derivable therefrom.

In some embodiments, said determining circuitry is operable to receive a network policy indicative of signals to be re-routed over a wireless access path that is different to that indicated by a network layer associated with said signals, said determining being performed in dependence said received network policy.

An eighth aspect of the present invention provides a client device comprising a processor according to a seventh aspect and a transport layer header generator operable to generate said transport layer portion of said signal and operable on said client device establishing a session connection with said server, to generate a transport layer identifier that uniquely identifies said session connection, and to associate said transport layer identifier with signals transmitted over said session connection.

In some embodiments, said transport layer header generator is operable to generate said transport layer identifier by generating a transport layer identifier and providing said transport layer identifier with an offset.

In some embodiments, said transport layer header generator is operable to append said generated transport layer portion to a spoof transport layer portion suitable for an analogous signal transmitted over said new wireless access path.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided.

Embodiments seek to provide a practical solution for high-quality multi-path communications capable of delivering forward-link payload data and reverse-link control feedback over different physical paths. In this way, problematic contention causing traffic such as uplink TCP ACKs can be seamlessly delivered over a more suitable path, e.g. scheduled HSPA and LTE networks instead of WiFi. In this way a wireless service with even quality and increased network capacity that is greater than the plain sum of non-aggregated single-path throughputs can be provided.

Figure 1:
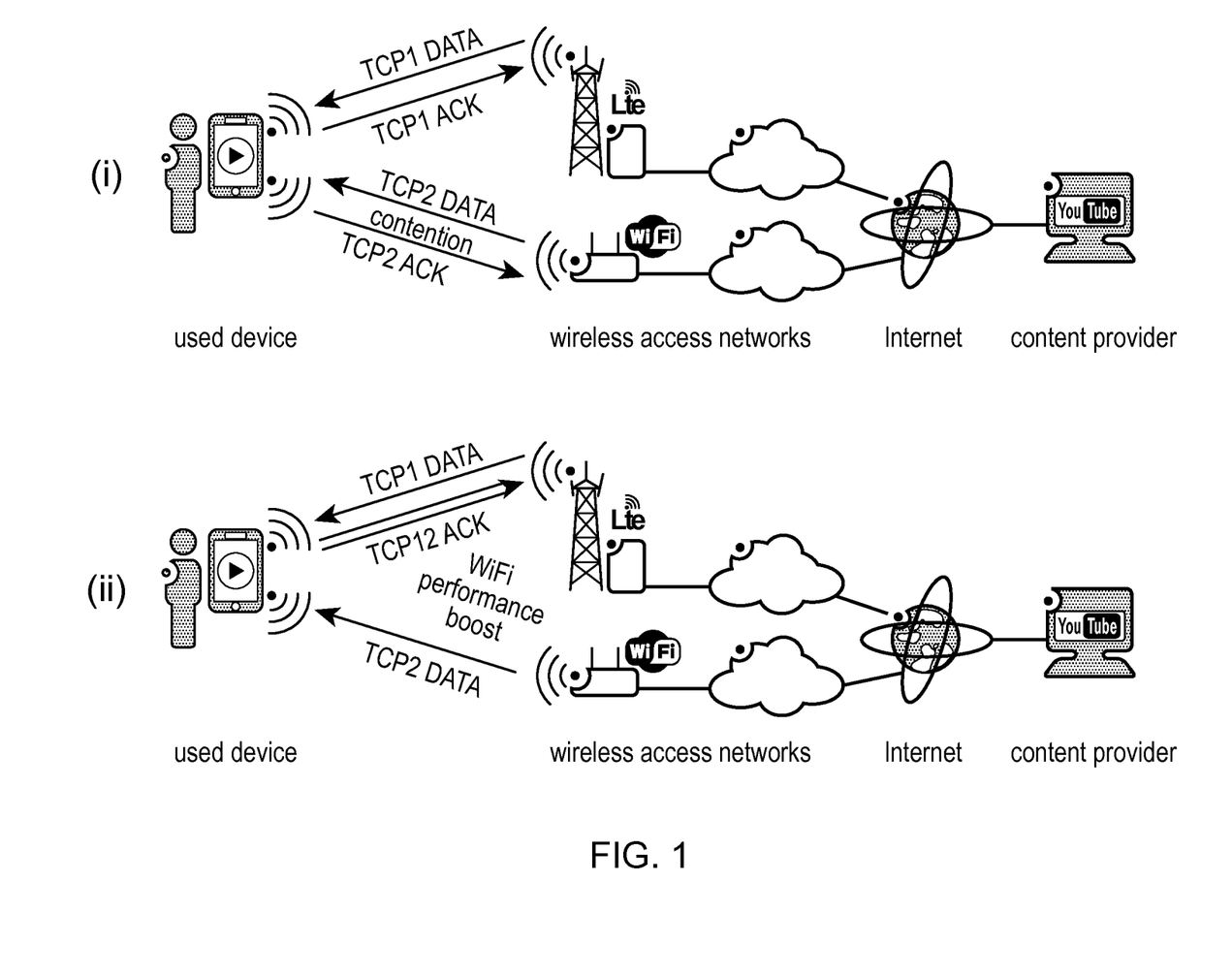
FIG. 1 schematically illustrates multi-path delivery of payload data to a mobile device using WiFi and LTE in parallel.

The use of multiple paths using different wireless access networks to connect a client and server can increase throughput and link reliability but may have complex routing problems. In this regard, routing of the signal is performed at the network layer where information regarding the source destination and other details of the signal being transmitted are added to the signal. These allow the network to route the signal in the appropriate manner. FIG. 1 schematically shows how sending uplink signals from a client to a server via the scheduled LTE link rather than via the WiFi link can increase performance. FIG. 1(*i*) shows how WiFi uplink traffic such as TCP acknowledgements (ACK) significantly degrades WiFi (TCP) downlink throughput as a result of contention-based medium access; while FIG. 1 (*ii*) shows how re-directing TCP ACKs to LTE eliminates or at least reduces contention-caused degradation of WiFi performance.

Embodiments seek to allow multi-path transmission of data by using non-network layer identifiers to identify the route without requiring explicit signalling between the client and server. In this regard transport layer header parameters which are transmitted with the signal being routed are used to identify the route. The network layer headers are amended to allow the network layer to transparently re-route the signal, while the transport layer header can be used to determine the original routing and thus, the correct destination.

In effect deriving the original destination from the transport-layer solves the problems of the existing IP-based solutions regarding deployment flexibility, allowing flow selectivity, and performance control.

Assuming with no loss of generality a bi-directional connection for data exchange between a server and a client consisting of (i) a downlink subflow for payload data, and (ii) an uplink subflow for control feedback, embodiments propose as visualized by FIG. 1 to allow the client to send uplink subflows over physical paths that are possibly different compared to the associated downlink subflows from the server (e.g., send uplink TCP ACKs for TCP payload data, received over WiFi downlink, over LTE uplink to eliminate load-dependent contention-caused degradation of WiFi downlink throughput), to allow the server to deliver the re-directed uplink subflows to their corresponding flow sockets by using subflow-to-socket mapping based on distinct non-IP identifiers such as TCP sequence/acknowledgment numbers, time-stamps, packet length, to allow the sender and/or receiver to suitably initialize the non-IP identifiers to avoid mapping errors (e.g. by using pre-defined offsets with a order-of-magnitude smaller random component).

A practical solution for eliminating or at least reducing medium access contention and packet collisions in the WiFi component of multi-radio-access networks is provided. As a result, embodiments provide low degradation wireless services with even quality, and additionally increase the network capacity well beyond the plain sum of non-aggregated single-path throughputs.

In particular, by allowing the scheme to be applied to particular signals, differentiation of user traffic class/application is possible, providing more tailored treatment of real-time low-latency data such as Skype, and best-effort bulk transfers such as background FTP downloads.

Native TCP tools for congestion monitoring/control enable efficient load-aware adaptive offloading and path switching, i.e. better throughput and latency performance thanks to active mitigation of re-ordering/queuing delays and data losses after buffer overflows.

Furthermore, the proposed scheme is distributed, i.e. no server-client exchange of data is needed for its initialization.

Figure 2A:
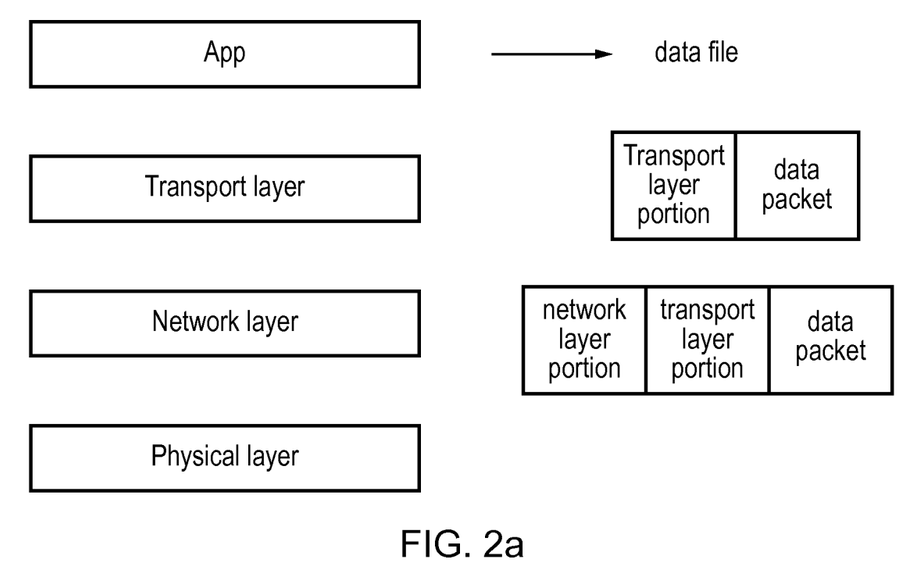
FIG. 2a schematically shows the different layers that generate the wireless communication signals.

A system for transporting packets of data may be modelled by different layers which include the application layer, the transport layer, the network layer and the physical layer. FIG. 2a schematically shows these different layers. A data file that is generated at the application layer is transmitted to the client as a set of data packets. In order to be able to reassemble the data packets to form the data file at the destination, information regarding the link over which the packets are transmitted is added to the data packet at the transport layer. This information may include a sequence number and/or time of transmission. Responses or acknowledgements (acks) are transmitted from the client to the server to indicate that packets have been successfully received and these too contain information in the transport portion that identify the link or session connection over which they are connected and may include the sequence and/or time of transmission. In this way the response or ack can be tied to the original data packet. The transport portion or header may use the transport control protocol (TCP) which provides a sequence number indicating where in a file the data packet is located and a time stamp indicating when it was sent. The sequence numbers may be selected to be unique to the particular link and in this way can be used to identify the link and thus, the network access path that the session connection formed to transmit this file was set up on.

A network layer portion or routing header is then added to the packet and this is done at the network layer and the parameters in this portion control the routing of the packet or signal and contain information about the source and the destination. This information may be in the form of IP addresses. As can be envisaged, changing the parameters of the network layer may change the route that the signal is sent via but it may also change the destination it arrives at unless there is provided some way of intercepting signals whose routes have been changed and identifying the original destination. Embodiments of the present invention address this problem by using the transport layer parameters as an indication of the original path thus, the destination. In effect where there is a discrepancy between the path indicated by the transport layer and that indicated by the network layer, the original route and thus, the final destination is determined from information in the transport layer portion.

In order for the transport layer identifier to uniquely identify a particular path, it is advantageous if the identifiers given to each session connection are different to each other. Thus, it may be advantageous if any identifier that is generated is then provided with an offset that is selected to make that identifier unique. These identifiers can be used to identify the connection and from this the access network that the connection was set up to use. These identifiers may take the form of sequence numbers. Furthermore, where additionally time stamps are transmitted with each message or signal, these can be used together with the sequence number to uniquely identify a particular connection and thus where required, the network or network access path that it was originally meant to be sent over.

Figure 2B:
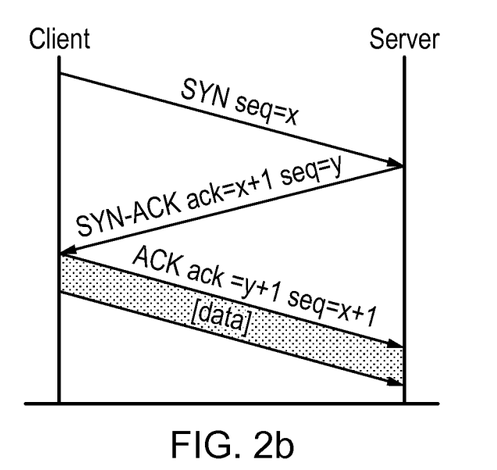
FIG. 2b schematically shows the generation of a session connection using a TCP 3-way handshake with indicated SEQ and ACK numbers.

FIG. 2b shows how the 3-way handshake performed when a connection is formed between a client and a server using the TCP protocol. When a TCP session is being established, several TCP header parameters are set to some initial (random or simply sequential) values. Thus, FIG. 2b shows how uplink and downlink sequence SEQ number are initialised and exchanged according to the IETF standard during connection setup. Timestamp values TSvals are also generated and exchanged in a similar way although this is not shown.

In order for each session connection to be uniquely identified it is proposed that multiple sessions initialise their SEQ/ACK/TSval values with a mutual offset such that no two sessions overlap. This is described in more detail with respect to FIG. 4. This allows a non-IP identifier to uniquely identify the session connection and as the access network used for this session connection is known, this can be used to identify the access network that the session connection was set up to use.

Figure 3:
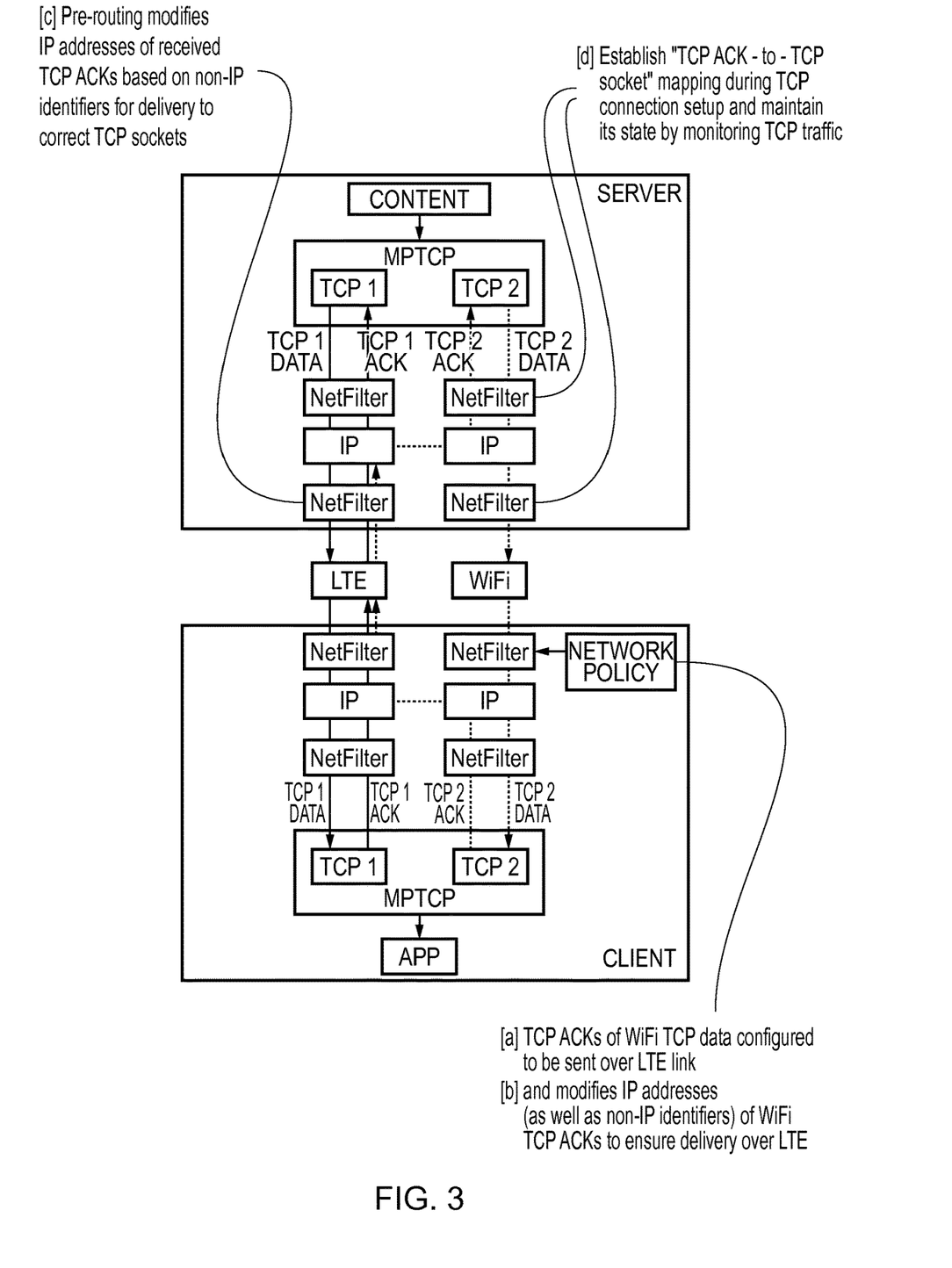
FIG. 3 illustrates an exemplary implementation of the invention using NetFilter framework.

FIG. 3 schematically shows a client and server according to an embodiment. The client may be a user device such as a smart phone, a tablet or a laptop computer. The server may be a content server for supplying content to users or some other device for providing data to clients.

In this embodiment Multi-path Transport Control Protocol (MPTCP) is used as the transport layer protocol. MPTCP binds one or multiple TCP subflows into one logical connection between a content data server and a user client application.

In the client device, a network policy module (such as that disclosed in Milind Madhav Buddhikot, Lance Hartung, "Policy Driven Multi-band Spectrum Aggregation for Ultra-broadband Wireless Networks", IEEE DySPAN, 2015) specifies what physical paths can be accessed and whether they are used symmetrically for ACK delivery (see marker [a] in FIG. 3). For example, network policy can specify for bulk-transfer applications that the WiFi interface can be used solely in the downlink direction,
the LTE interface can be used in both the uplink and downlink direction.

The above may be selected to prevent undesired uplink-downlink contention and the resulting WiFi performance degradation. In other words, no uplink traffic including TCP acknowledgments can be then sent over WiFi.

FIG. 3 schematically shows the different wireless access paths provided by the different access networks between the server and client. Signals that are diverted such that they are sent between these devices on a different access path to that originally envisaged, need to be rerouted within the receiving device such that they arrive at the correct "socket" and can be processed by the appropriate receiver. Embodiments allow this to happen by providing information on the originally envisaged path and therefore on the destination socket in the transport layer header.

To implement the above "WiFi uplink over LTE uplink" policy, a client pre-routing function (see marker [b] in FIG. 3) modifies the source/destination IP addresses of the uplink TCP packets prior to passing them to the network so that the network can then transparently carry out the desired traffic routing. The non-IP identifiers that are modified are simply the checksums. The transport layer identifiers remain the same.

On the server side, a server pre-routing function (see marker [c] in FIG. 3) modifies the destination IP addresses of all TCP ACKs such that the IP layer subsequently ensures delivery to the correct TCP state machines of the server.

As described in more detail subsequently, the server establishes the "TCP ACK-to-TCP socket" mapping during TCP connection setup and maintains its state by monitoring TCP traffic (see marker [d] in FIG. 3). In this regard it identifies the TCP identifiers such as sequence numbers and timestamp values associated with a session connection and also the access network that the session connection was set up on (in this case WiFi), it then monitors these as they evolve such that it can identify the session from values associated with other signals and where they indicate they came via the LTE network they can be re-routed within the server to the state machine receiving the WiFi signals.

Packet filtering, monitoring, and mangling frameworks such as NetFilter for Linux [http://netfilter.org/] can be used to implement the pre/post-routing functions without the need to alter the functionality of the transport layer (e.g., TCP state machines) and the network or IP layer (e.g., IP routing tables), an advantageous feature in terms of software compatibility, deployability, and maintenance.

Although marker [c] in FIG. 3 shows the filtering before the IP layer such that the IP address is changed allowing the IP layer to route the signal appropriately. In other embodiments the filtering may be performed after the IP layer whereupon the routing is performed by mapping the signal to a different address, i.e. that of the appropriate state machine.

In this regard, when the client re-directs TCP ACK packets from one path to another by amending the network layer parameters, that is in this embodiment by overwriting the original IP addresses, the IP routing information is no longer usable for the TCP socket identification at the server.

Thus, to ensure correct delivery of TCP ACKs for example, without any explicit communication between the client and the server, the invention proposes to use non-IP identifiers, in this example, transport (TCP) layer identifiers are used, namely the TCP sequence/acknowledgment number (SEQ/ACK),
the TCP time-stamp values (TSval).

When a TCP session is being established, several TCP header parameters are set to some initial (random or simply sequential) values as explained with respect to FIG. 2b.

Figure 4:
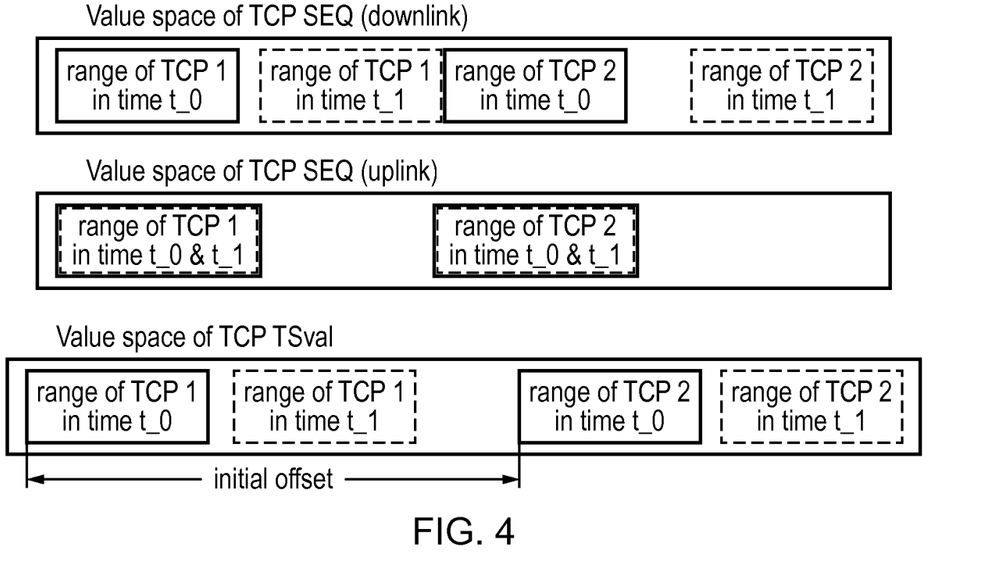
FIG. 4 shows a visualization of TCP parameter offsetting during initialization, and TCP session identification based on TCP parameters.

Embodiments propose that multiple sessions initialize their SEQ/ACK/TSval values with a mutual offset such that no two sessions overlap with their parameter space (see FIG. 4). For example, a new TCP session to a given host can be initialized with a constant offset, including a tiny component, e.g. order-of-magnitude smaller than the offset.

The TCP protocol increments downlink SEQ values individually per TCP session as a function of the amount of data sent within the session. Since TCP is typical used in half-duplex mode in which no uplink data are piggybacked by the TCP ACKs of downlink data, the uplink SEQ numbers will remain constant. On the other hand, time-stamp values TSval are incremented uniformly for all TCP sessions as function of time.

Hence, with good parameter initialization, it is practically impossible that current in-flight packets of all active TCP sessions have identical value spaces for BOTH time-paced TSval values and data-paced SEQ numbers. Note that uplink SEQ can serve as a TCP session identifier on its own.

This allows simple inspection of TCP packet by Netfilter layers to establish and maintain the required "SEQ/TSval-to-TCP session" mapping.

TCP ACK Transmission Format

Figure 5:
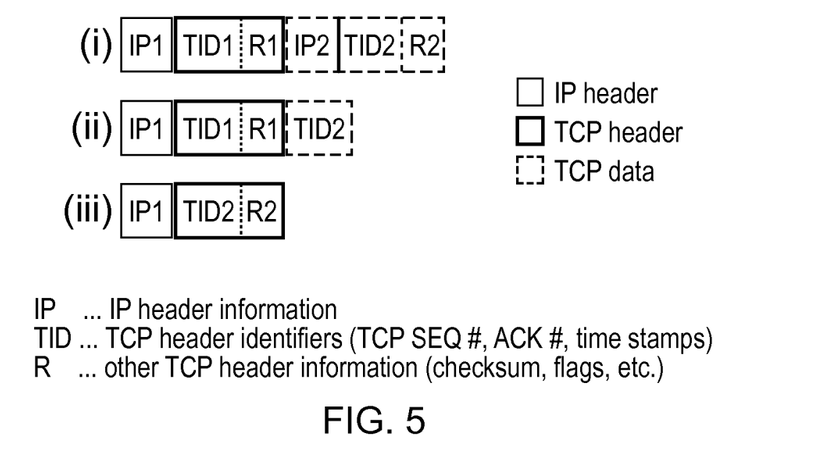
FIG. 5 schematically provides a logical representation of delivery modes for re-directed TCP ACKs.

TCP packets can be sent in multiple forms as visualized by FIG. 5. FIG. 5 schematically provides a logical representation of delivery modes for re-directed TCP ACKs. (i,ii) shows re-directed TCP ACK of subflow 2 is entirely/partially appended to a duplicate "native" TCP ACK of subflow 1 as payload data; and (iii) re-directed TCP ACK of subflow 2 is used to modify non-IP identifiers of a duplicate "native" TCP ACK of subflow 1.

In particular, cases (i) and (ii) show transmission modes suitable for ameliorating undesired impact of various middle-boxes present in the Internet such as firewalls which check the consistency of observed SEQ and ACK numbers. Herein, the TCP ACK packets re-directed from other physical paths can be entirely/partially encapsulated within the TCP ACK packets "natively" corresponding to the transport path and exhibiting TCP identifiers within the expected range. Thus, the WiFi acks will arrive at the server, but will be appended to an ack that is suitable for being sent via the LTE network.

The actions of generating duplicate TCP ACKs of the "native" subflow and piggybacking re-directed ACKs into their payload are both permissible operations in view of the TCP standard. The latter option is based on the full-duplex TCP delivery mode.

Note that detecting transmission option (i) is based sequentially on checking whether
  the payload of an intercepted TCP ACK is equal to the size of a TCP ACK (i.e., a TCP ACK is contained)
  the contained ACK passes a TCP checksum test, i.e., non-IP parameters of the TCP ACK packet are used for filtering as discussed above.

Option (iii) is based on generating a new hybrid packet based on combining segments of both native and re-directed packet, an option suitable for controlled environments such as VRAN or enterprise scenarios.

Figure 6:
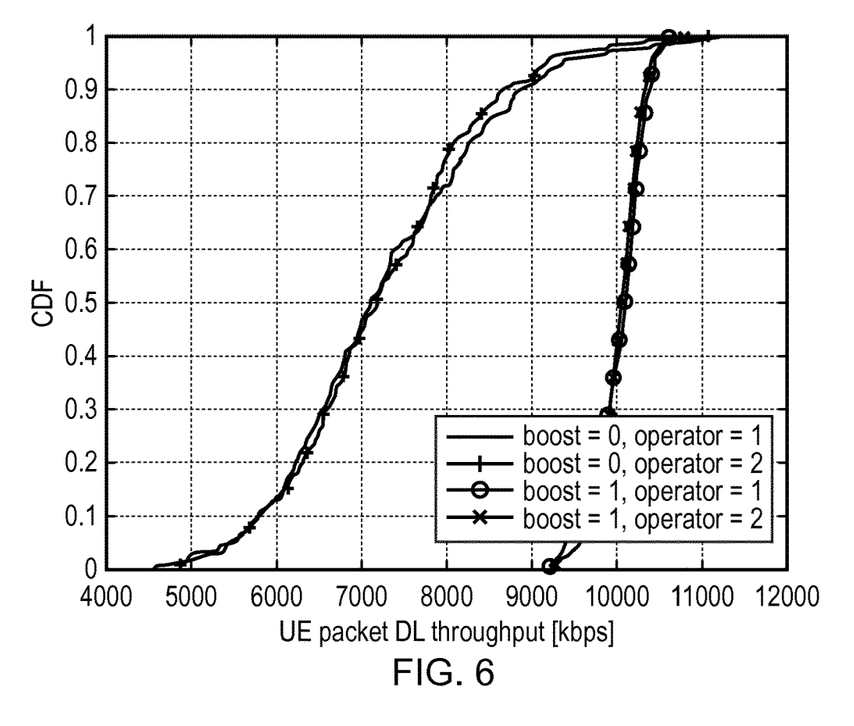
FIG. 6 shows the % improvement of mean capacity in a network aggregating LTE and WIFI.

FIG. 6 shows a graph illustrating the mean capacity improvement of about 32% of a network that aggregates LTE and WiFi. In this scenario there were 2 operators, 1 outdoor WiFi access point and 6 active UEs in each.

Figure 7:
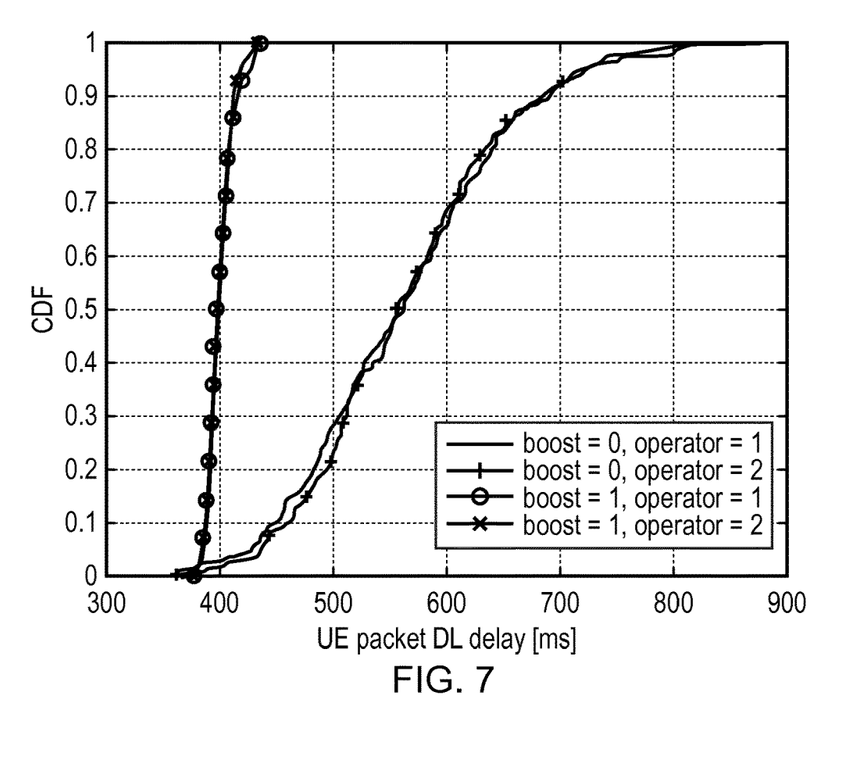
FIG. 7 shows the improvement of mean latency in a network aggregating LTE and WIFI.

FIG. 7 shows a yield improvement of about 37% for the mean latency in a network aggregates LTE and WiFi. In this scenario there were again 2 operators, 1 outdoor WiFi access point and 6 active UEs in each.

Figure 8:
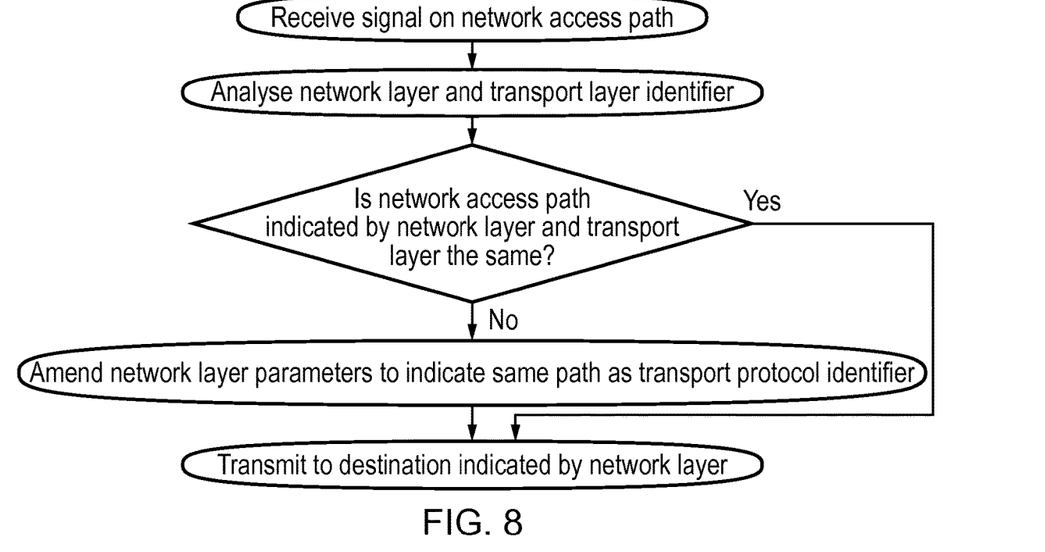
FIG. 8 shows a flow diagram schematically illustrating steps performed at a server according to an embodiment.

FIG. 8 shows a flow diagram illustrating steps of a method performed at a server according to an embodiment. In this method signals are received at the server along a network access path using a particular radio interface. As there may have been re-routing of some signals the server is configured to compare the paths indicated by the network layer and transport layer identifiers to determine whether there is any inconsistency. Where there is a discrepancy then the path indicated by the transport layer is taken to be the correct path and in this embodiment the network layer parameters indicating the route are updated. The signal is then transmitted to the destination indicted by the updated network parameters.

It should be noted that in some cases all signals received at the server are analysed while in others only a subset of signals are analysed. This subset may be selected based on a network routing policy which indicates the type of signal that may have been re-routed. In some embodiments there is no comparison of the network layer and the transport layer, rather for the subset of signals indicated by the network routing policy the network access path and from this the destination is determined from the transport layer.

Figure 9:
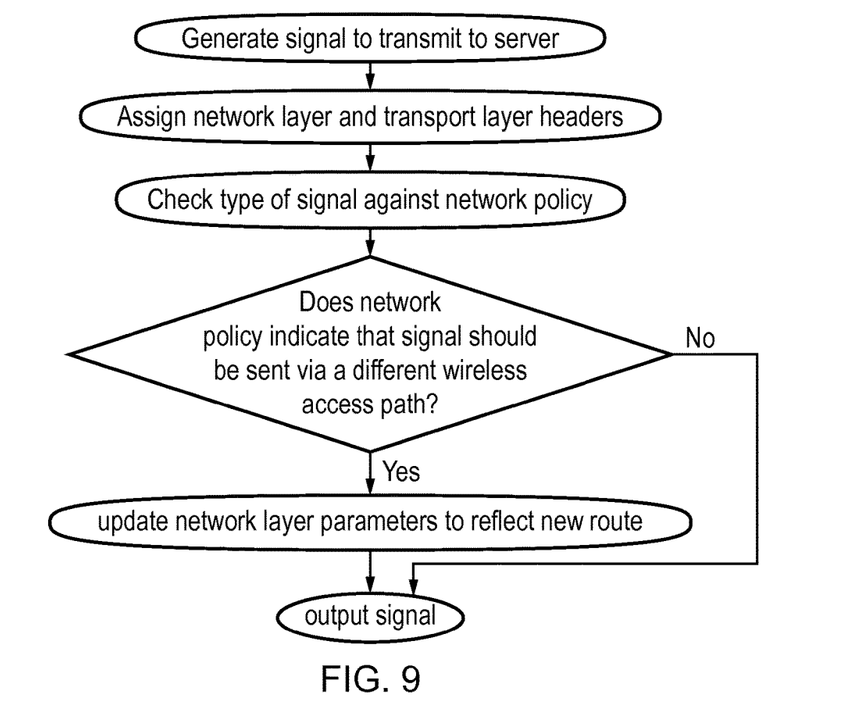
FIG. 9 shows a flow diagram schematically illustrating steps performed at a client according to an embodiment.

FIG. 9 shows a flow diagram illustrating steps of a method performed at a client according to an embodiment. In this method signals are generated at the client to transmit to the server. These signals may be response signals generated in response to data received from the server. The signals are assigned network layer and transport layer headers which include a transport layer identifier which provides an indication of the path the signal is to take, that is the wireless network used, and a network layer header which is used in re-routing of the signal. It is then determined if the signal is one that network policy indicates should be re-routed and where so parameters in the network layer header are updated to reflect the new route and the signal is output to travel to the server via the route indicated in the network layer. Where there is no updating of the network layer parameters the signal is simply output.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method performed at a server of routing signals received from a client, said client and server being configured to communicate over multiple wireless access paths each using a different wireless network, the method comprising:
   receiving at said server said signals from said client each signal being received via one of said wireless access paths, said signals comprising:
      a transport layer portion including a transport layer identifier, said transport layer identifier providing an indication of an originally envisaged wireless access path prior to any re-routing,
      a network layer portion providing an indication of a wireless access path taken, and
      a data portion;
   determining a destination of at least a subset of said signals from said wireless access path indicated by said transport layer identifier; and
   routing said signals to said destination, said at least a subset of said signals being routed to said destination on the basis of said transport layer portion.

2. The method according to claim 1, further comprising:
   analysing at least a subset of said signals;
   where said transport layer identifier indicates a different wireless access path to said network layer portion, amending said network layer parameters to correspond to said wireless access path indicated by said transport layer identifier.

3. The method according to claim 1, wherein said data portion comprises response data generated by said client in response to receipt of a data signal transmitted by said server, said transport layer identifier associated with said response signal identifying said wireless access path that said corresponding data signal was transmitted on.

4. The method according to claim 1, further comprising:
   analysing signals transmitted when establishing a session connection between said client and said server and determining a wireless access path used for said session connection and a transport layer identifier associated with said wireless access path.

5. The method according to claim 4, further comprising:
   monitoring evolution of said transport layer identifier associated with said session connection.

6. The method according to claim 1, further comprising:
   receiving a network policy indicating particular types of signals that may be re-routed via other wireless access paths, said subset of signals being said signals of said indicated type.

7. The method according to claim 1, said determining comprising:
   determining whether said transport layer portion of each of said signals has an expected size and
   where a size of said portions is larger than said expected size, discarding a first part of said transport layer portion and analysing a remaining part.

8. The method according to claim 1, wherein said determining is performed at a processor arranged either before or after said network layer.

9. A method performed at a client of routing a signal to a server via one of multiple wireless access paths, each using a different access network, the method comprising:
   generating a signal comprising
      a transport layer portion including a transport layer identifier,
      a network layer portion, and
      a data portion;
   said transport layer identifier and said network layer portion providing an indication of a wireless access path;
   determining whether said signal is to be transmitted via a wireless access path that is different to that indicated by said network layer portion and said transport layer identifier; and
   when so, amending said network layer portion to indicate said new wireless access path and maintaining said transport layer identifier such that said original wireless access path is derivable therefrom.

10. The method according to claim 9, further comprising:
    on establishing a session connection between said client and said server, providing said session connection with a transport layer identifier that uniquely identifies said session connection,
    associating said transport layer identifier with signals transmitted over said session connection.

11. The method according to claim 10, wherein said providing a unique transport layer identifier comprises
    generating a transport layer identifier and
    providing said transport layer identifier with an offset.

12. The method according to claim 9, further comprising:
    receiving a network policy indicative of signals to be re-routed over a wireless access path that is different to that indicated by a network layer associated with said signals, said determining being performed in dependence upon said received network policy.

13. The method according to claim 9, further comprising:
    amending said transport layer portion by appending said generated transport layer portion to a spoof transport layer portion suitable for an analogous signal transmitted over said new wireless access path.

14. A non-transitory computer-readable medium storing program instructions, that when executed by a processor, cause a server to perform the method according to claim 1.

15. A routing device for a server, the routing device comprising:

at least one processor;

at least one memory including computer program code; and routing circuitry;

wherein the routing device is configured to route signals received at a server from a client via one of multiple wireless access paths, each using a different access network;

wherein said signals each include:
- a transport layer portion including a transport layer identifier, said transport layer identifier providing an indication of an originally envisaged wireless access path prior to any re-routing,
- a network layer portion providing an indication of a wireless access path taken, and
- a data portion;

wherein the at least one memory and the computer program code are configured to, with the at least one processor, cause the routing device to determine a destination of at least a subset of said signals from said wireless access path indicated by said transport layer identifier;

wherein the routing circuitry is configured to route said signals to said destination, said at least a subset of said signals being routed to said destination on the basis of the transport layer portion.

16. A client device, comprising:

at least one processor; and at least one memory including computer program code;

wherein the at least one memory and the computer program code are configured to, with the at least one processor, cause the client device to generate a signal;

wherein said signal includes:
- a transport layer portion including a transport layer identifier,
- a network layer portion, and
- a data portion, wherein said transport layer identifier and said network layer portion provide an indication of a wireless access path;

wherein the at least one memory and the computer program code are configured to, with the at least one processor, cause the client device to process said signal to be routed from said client device to a server via one of multiple wireless access paths, each using a different access network;

wherein the at least one memory and the computer program code are configured to, with the at least one processor, cause the client device to determine whether said signal is to be transmitted via a wireless access path that is different to that indicated by said network layer portion and said transport layer identifier;

wherein the at least one memory and the computer program code are configured to, with the at least one processor, cause the client device to amend said network layer portion to indicate said different wireless access path after determining said signal is to be transmitted via said different wireless access path and to maintain said transport layer identifier such that said original wireless access path is derivable therefrom.

17. A non-transitory computer-readable medium storing program instructions, that when executed by a processor, cause a client to perform the method according to claim 9.

18. The routing device according to claim 15, wherein the at least one memory and the computer program code are configured to, with the at least one processor, cause the routing device to receive a network policy indicating particular types of signals that may be re-routed via other wireless access paths, said subset of signals being said signals of said indicated type.

19. The routing device according to claim 15, wherein the at least one memory and the computer program code are configured to, with the at least one processor, cause the routing device to determine whether said transport layer portion of each of said signals has an expected size;

wherein the at least one memory and the computer program code are configured to, with the at least one processor, cause the routing device to discard a first part of said transport layer portion where a size of said portions is larger than said expected size and to analyse a remaining part.

20. The client device according to claim 16, wherein the at least one memory and the computer program code are configured to, with the at least one processor, cause the client device to receive a network policy indicative of signals to be re-routed over a wireless access path that is different to that indicated by a network layer associated with said signals;

wherein the at least one memory and the computer program code are configured to, with the at least one processor, cause the client device to determine the wireless access path in dependence upon said received network policy.

\* \* \* \* \*